United States Patent
Höök et al.

(10) Patent No.: US 6,473,506 B1
(45) Date of Patent: Oct. 29, 2002

(54) SIGNALING USING PHASE ROTATION TECHNIQUES IN A DIGITAL COMMUNICATIONS SYSTEM

(75) Inventors: Mikael Höök, Sollentuna; Stefan Jäverbring, Älvsjö, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/170,127

(22) Filed: Oct. 13, 1998

(51) Int. Cl.⁷ .......................... H04L 27/10; H04L 27/18
(52) U.S. Cl. .................. 379/279; 375/308; 375/329; 375/340
(58) Field of Search .................. 375/259, 260, 375/272, 261, 295, 316, 324, 340, 354, 371, 279, 269, 273, 308, 329

(56) References Cited

U.S. PATENT DOCUMENTS

| | | | |
|---|---|---|---|
| 5,619,524 A | * 4/1997 | Ling et al. | |
| 5,659,573 A | 8/1997 | Bruckert et al. | |
| 5,802,079 A | * 9/1998 | Wang | |
| 5,815,529 A | * 9/1998 | Wang | 375/285 |
| 5,822,368 A | * 10/1998 | Wang | 375/229 |
| 5,828,954 A | * 10/1998 | Wang | 455/260 |

FOREIGN PATENT DOCUMENTS

| | | |
|---|---|---|
| EP | 0 094 058 A | 11/1983 |
| GB | 2 206 768 A | 1/1989 |
| WO | WO 94/00943 | 1/1994 |

OTHER PUBLICATIONS

Patent application No. US 2001/0001008 A1, May 2001.*

* cited by examiner

Primary Examiner—Jean Corrielus
(74) Attorney, Agent, or Firm—Burns, Doane, Swecker & Mathis, L.L.P.

(57) ABSTRACT

In a telecommunications system, such as a cellular radio telecommunications system, transmission information, such as modulation scheme selection information, coding information or power level control commands, is efficiently conveyed from the transmitter to the receiver without increasing the bandwidth requirements and without introducing additional transmission delays. This can be accomplished by employing a data symbol phase rotation technique, wherein a sequence of data symbols, for example, a sequence of training symbols used for estimating the propagation characteristics of a given channel, are phase-rotated in accordance with a phase rotation factor that uniquely corresponds to the information being conveyed to the receiver. At the receiver, the symbols are de-rotated until the receiver recovers the training sequence. This allows the receiver to determine the phase rotation factor used to rotate the symbols at the transmitter. This, in turn, identifies the corresponding transmission information.

32 Claims, 7 Drawing Sheets

SIGNALING USING PHASE ROTATION TECHNIQUES IN A DIGITAL COMMUNICATIONS SYSTEM

FIELD OF INVENTION

The present invention generally relates to digital telecommunications systems. More particularly, the present invention relates to the transmission of information from a transmitter to a receiver without increasing the bandwidth requirement and without introducing transmission delays.

BACKGROUND

Digital telecommunications systems typically employ one or more modulation schemes to communicate information such as voice, data and/or control information. These modulation schemes may include, GMSK (Gaussian Minimum Shift Keying), M-ary QAM (Quadrature Amplitude Modulation), or M-ary PSK (Phase Shift Keying), where M denotes the number of modulation symbols specified for the different modulation schemes. The different modulation symbols correspond to different information symbols to be transmitted. In M=2 modulation schemes, for example, there are only two different modulation symbols specified. Hence, an M=2 modulation scheme is referred to as a binary modulation scheme.

The different types of modulation may be affected differently by the quality of the communication channel, i.e., different schemes may be more or less susceptible to distortion, time dispersion C/I ratios and the like. Accordingly, it is said that different modulation schemes have different levels of robustness. Generally, as the number of modulation symbols increases, i.e., as the value of M increases, the modulation scheme tends to be less robust. There are, however, other factors that influence the robustness of a modulation scheme, for example, the symbol rate. The symbol rate may also be specified differently for a given modulation scheme as well as between different modulation schemes.

In order to assure adequate communication quality with respect to e.g., information bit rates and error rates, link adaptation may be utilized. Depending on the (time-varying) quality of the communication channel, which may be affected by, for example, noise level, interference, path loss and time dispersion, a link adaptation strategy assures that an appropriate modulation scheme, channel coding, source coding, bandwidth and signal power level are chosen to obtain a link quality that satisfies user demands in terms of error rates, throughput and the like. To be truly effective, the link adaptation technique must be capable of monitoring and/or measuring the channel conditions over relatively short periods of time. Then, based on the present channel conditions, the system selects the modulation scheme or schemes that optimize link quality.

Telecommunications systems that employ Time Division Multiple Access (TDMA) divide the available frequency band into several RF channels. Each of these RF channels are then further divided into several physical channels or time slots. Voice, data and/or control information is then transmitted in bursts, wherein a burst corresponds to a physical channel or time slot. In a TDMA based system, link adaptation and modulation selection is typically accomplished on a burst-by-burst basis. It will be understood, however, that link adaptation is not limited to TDMA systems. Rather, link adaptation may also be performed in systems based on other access principles. For example, in CDMA (Code Division Multiple Access) Systems, one may vary, e.g., coding, modulation and spreading factors to achieve a desired link quality.

An important aspect of any link adaptation and modulation selection technique is the way in which the transmitter informs the receiver of the modulation scheme selected for a particular burst of information. Probably, the most straightforward technique for informing the receiver as to the modulation scheme associated with a particular burst of information involves signaling the receiver in advance. However, this technique is highly undesirable as it results in additional overhead (i.e., an increase in the bandwidth requirement) which, in turn, results in transmission delays.

Another technique for conveying modulation selection information to the receiver involves the use of training sequences. As one skilled in the art will readily appreciate, training sequences are typically employed at the receiver for estimating the distortion and noise characteristics of a channel. For example, upon receiving a training sequence, the receiver compares the values associated with the received training sequence to the values associated with an expected training sequence. The receiver then utilizes the difference to characterize the channel (i.e., estimate the channel).

In order to use the training sequences to convey modulation selection information to the receiver, one or more training sequences must be assigned to each of the various modulation schemes. However, this solution also has a number of disadvantages. Foremost is the fact that it is difficult to identify an adequate number of unique training sequences with good auto correlation properties. Also, additional memory is required to store each of the additional training sequences. Furthermore, additional control software is needed to handle the additional training sequences.

Ideally, the receiver should be able to determine the modulation scheme associated with a particular burst of information without advanced signaling from the transmitter, as advanced signaling introduces bandwith loss and transmission delays. Also, the receiver should be able to determine the modulation scheme during the channel estimation process (i.e., prior to the equalization process), as the equalization process is complex and modulation dependent. Furthermore, the receiver should be able to detect the modulation scheme independent of the fact that each, or at least two or more, modulation schemes employ the same training sequence and symbol rate.

SUMMARY OF THE INVENTION

The present invention involves a technique which allows a transmitter in a telecommunications system to transmit signaling information, such as information relating to modulation format, to a receiver without increasing the transmission bandwidth and without introducing any significant transmission delays. In general, the present invention accomplishes this by employing a symbol constellation phase rotation technique.

Accordingly, it is an object of the present invention to convey transmission information, such as modulation information, to a receiver in a telecommunications system without advanced signaling from the transmitter.

It is another object of the present invention to convey transmission information to a receiver in a telecommunications system without increasing overhead (i.e., without increasing the bandwidth requirements).

It is still another object of the present invention to convey transmission information to a receiver in a telecommunications system, wherein the receiver recognizes the information prior to equalization and independent of the training sequences and symbol rates used during channel estimation.

In accordance with one aspect of the present invention, the foregoing and other objects are achieved by a method and/or apparatus for transmitting signaling information from a transmitter to a receiver. The method and/or apparatus involves identifying one of a plurality of information signals to be conveyed from the transmitter to the receiver in addition to data and then rotating each of one or more symbols by a common phase rotation factor, wherein the phase rotation factor uniquely identifies the one information signal to be conveyed from the transmitter to the receiver. Each of the one or more phase-rotated symbols is then transmitted to the receiver.

In accordance with another aspect of the present invention, the foregoing and other objects are achieved by a method and/or apparatus for conveying modulation information from a transmitter to a receiver. The method and/or apparatus involves selecting one of a plurality of modulation schemes and modulating a sequence of training symbols in accordance with the selected one of the plurality of modulation schemes. A phase rotation factor is then identified which corresponds to the selected one of the plurality of modulation schemes, wherein at least one unique phase rotation factor is associated with each of the plurality of modulation schemes. The phase of each training symbol is then rotated as a function of the identified phase rotation factor which corresponds to the selected one of the plurality of modulation schemes, and the sequence of phase-rotated training symbols are transmitted to the receiver. At the receiver, a sequence of de-rotated training symbols is generated for each phase rotation factor by de-rotating the received sequence of phase-rotated training symbols as a function of each phase rotation factor. Each sequence of de-rotated training symbols is then compared to an expected sequence of training symbols, and the sequence of derotated training symbols that approximates the expected sequence of training symbols most accurately is identified. Finally, the selected one of the plurality of modulation schemes is identified based on the phase rotation factor that produced the sequence of de-rotated training symbols that most closely approximated the expected sequence of training symbols.

In accordance with yet another aspect of the present invention, the foregoing and other objects are achieved by a method and/or apparatus for identifying signaling information transmitted from a transmitter to a receiver along with data. The method and/or apparatus involves receiving a signal containing a sequence of symbols transmitted from the transmitter, wherein the symbols include training symbols and data symbols, and wherein the phase associated with each symbol in the sequence of symbols has been rotated at the transmitter in accordance with a common phase rotation factor that corresponds to the signaling information. Samples from the received signal are then generated, wherein the samples correspond to the sequence of transmitted symbols. The sequence of transmitted symbols is then recovered by de-rotating the samples in accordance with the common phase rotation factor; and the signaling information is identified as a function of the common phase rotation factor used to recover the sequence of transmitted symbols.

BRIEF DESCRIPTION OF THE DRAWINGS

The objects and advantages of the present invention will be understood by reading the following detailed description in conjunction with the drawings in which.

DETAILED DESCRIPTION OF THE INVENTION

The present invention entails a transmission technique wherein a transmitter, in a telecommunications system, such as a cellular radio telephone system, is capable of transmitting signaling information to a receiver, such as information relating to a selected modulation scheme associated with a burst of telecommunications data, without transmitting signaling in advance, without increasing the transmission bandwidth, and without increasing transmission delays. One skilled in the art will, however, readily appreciate the fact that the present invention can be utilized to efficiently transfer other types of transmission information, besides modulation information, as will be explained in greater detail below. In general, the present invention provides this capability by rotating the phase of the symbols to be transmitted, which may include a sequence of training symbols, by an angular amount that is uniquely associated with the signaling information to be transmitted. Consequently, the receiver is capable of identifying the information, based on the amount of phase rotation applied to the symbols at the transmitter.

Figure 1A:
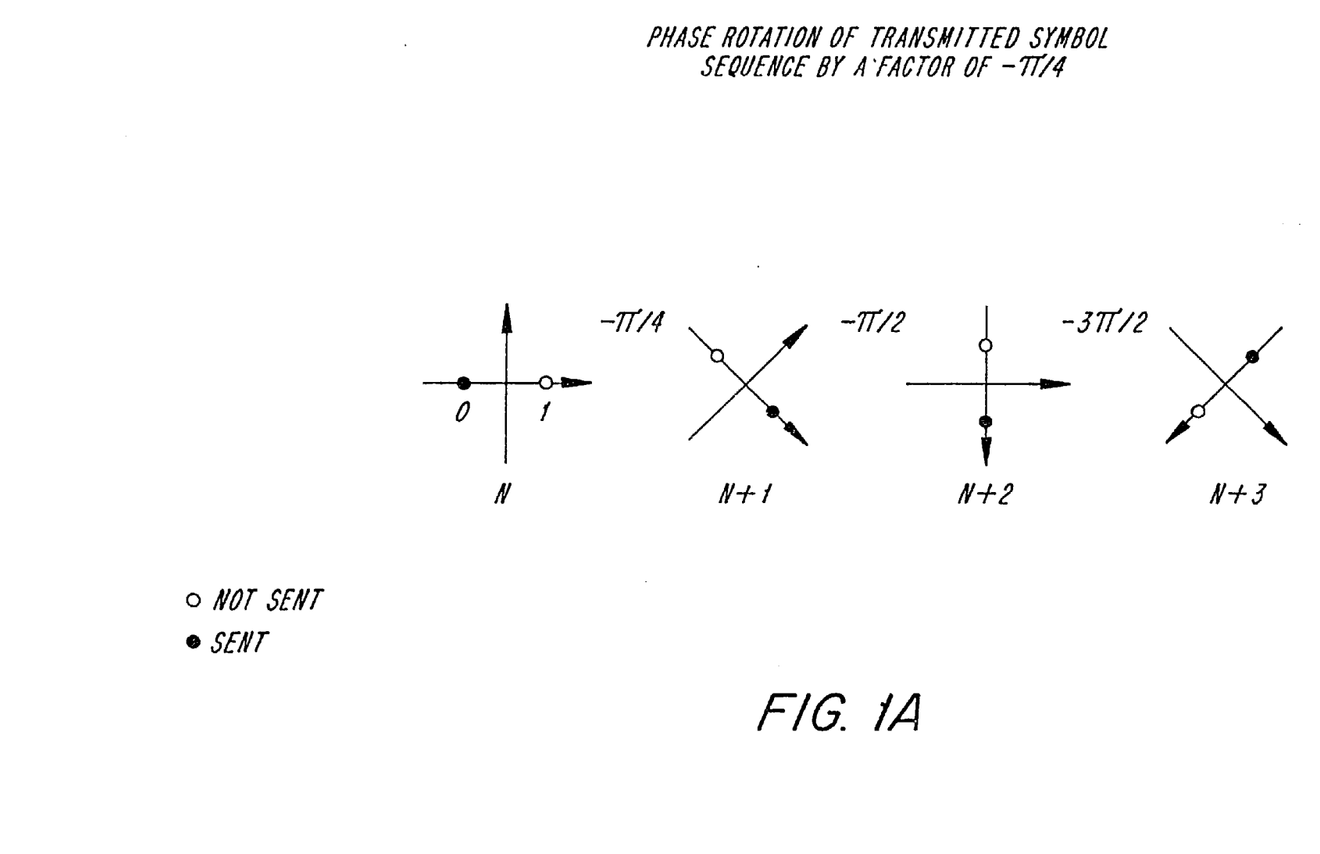
FIGS. 1A–1B illustrate a phase rotation and phase de-rotation technique in accordance with the present invention.
Figure 1B:
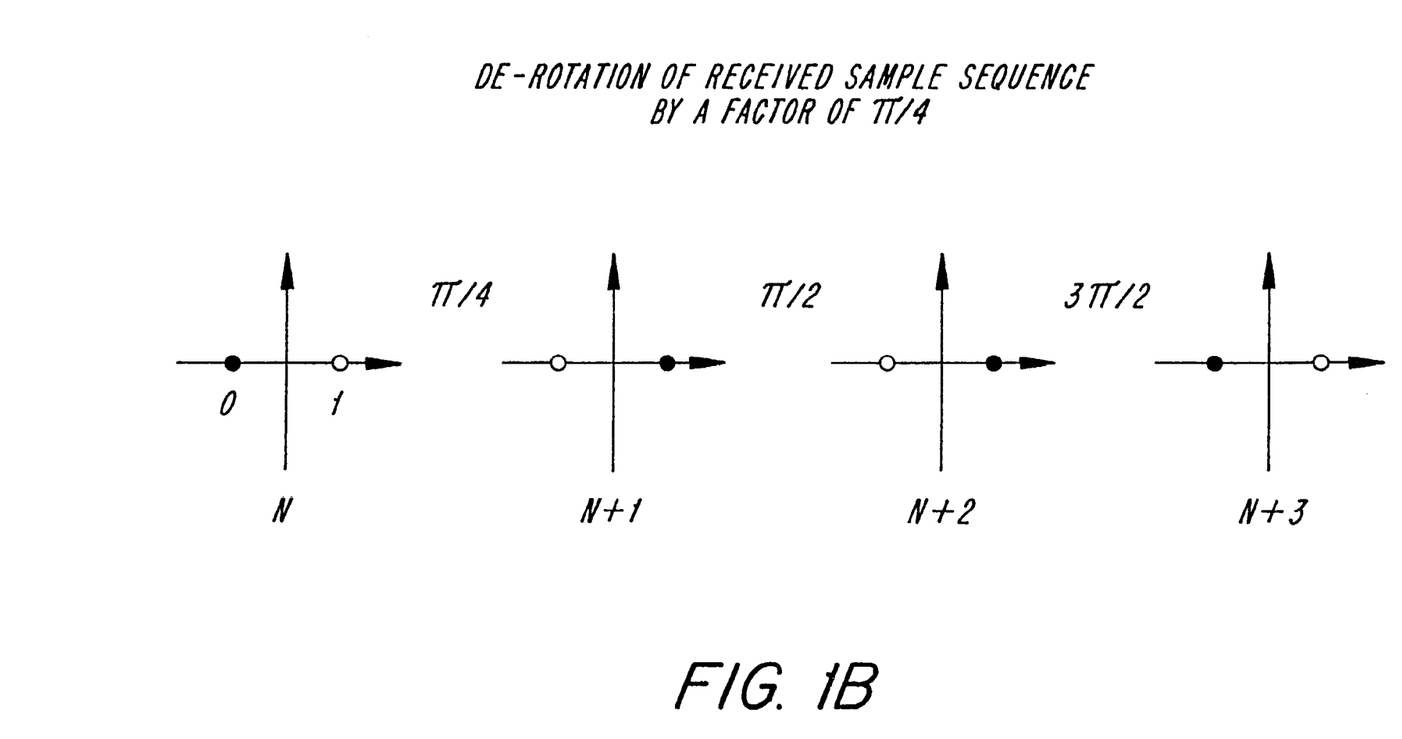

FIGS. 1A and 1B illustrate the basic concept of the present invention. More specifically, FIG. 1A shows the transmitter sending a sequence of symbols (e.g., a sequence of training symbols) comprising four symbols N, N+1, N+2, and N+3. In the example illustrated in FIG. 1A, each symbol represents a single binary bit value, wherein the symbol N equals 0, the symbol N+1 equals 1, the symbol N+2 equals to 1, and the symbol N+3 equals to 0. Hence, the symbol sequence to be transmitted from the transmitter to the receiver is 0110.

In accordance with the present invention, a predetermined amount of phase rotation uniquely associated with the modulation scheme is introduced for each symbol. In the example illustrated in FIG. 1A, the phase rotation introduced involves a phase rotation factor of $-\pi/4$. Accordingly, the symbol N is transmitted with a logical value of 0 and a phase rotation of 0 (i.e., $0*-\pi/4$); the symbol N+1 is transmitted with a logical value of 1 and a phase rotation of $-\pi/4$ (i.e., $1*-\pi/4$); the symbol N+2 is transmitted with a logical value of 1 and a phase rotation of $-\pi/2$ (i.e., $2*-\pi/4$); and the symbol N+3 is transmitted with a logical value of 0and a phase rotation of $-3\pi/4$ While FIG. 1A illustrates the basic concept of the present invention with respect to the transmitter, FIG. 1B illustrates the basic concept of the present invention with respect to the receiver. In order for the receiver to recapture the transmitted sequence 0110, the receiver must de-rotate each of the received samples until the expected value is detected. In doing so, the receiver is able to recognize that a phase rotation factor of $\pi/4$ is needed to recapture the sequence 0110. More specifically, upon receiving the first sample N, the receiver need not de-rotate the sample at all (i.e., a phase rotation of 0*π4) to recapture the expected sample value of 0. However, upon receiving the second sample N+1, the receiver recognizes that it must de-rotate the received sample by a factor of π/4 to recapture the second expected sample value 1. Upon receiving the third sample N+2, the receiver recognizes that it must de-rotate the received sample by an additional factor of π/4 (i.e., a total phase rotation of 2*π/4) to recapture the third expected sample value 1. Likewise, upon receiving the fourth sample N+3, the receiver recognizes that it must de-rotate the received sample by yet another factor of π/4 (i.e., for a total phase rotation of 3*π/4) to recapture the fourth expected sample value 0. Had the receiver de-rotated the received samples using a phase rotation factor other than π/4, the receiver would have failed to recapture the sequence 0110. Accordingly, the receiver can use the phase rotation factor (e.g., −π/4) as an indication of the modulation scheme. In a preferred embodiment, the process of determining the modulation scheme is accomplished during channel estimation so that the modulation scheme is known prior to the process of channel equalization.

Figure 4A:
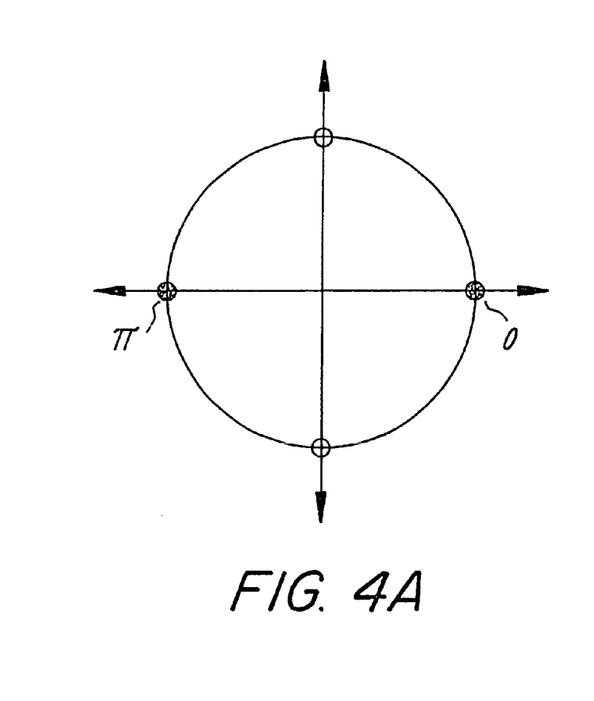
FIGS. 4A–4B illustrate the use of a subset of points in a 4-PSK and an 8-PSK symbol constellation during training.
Figure 4B:
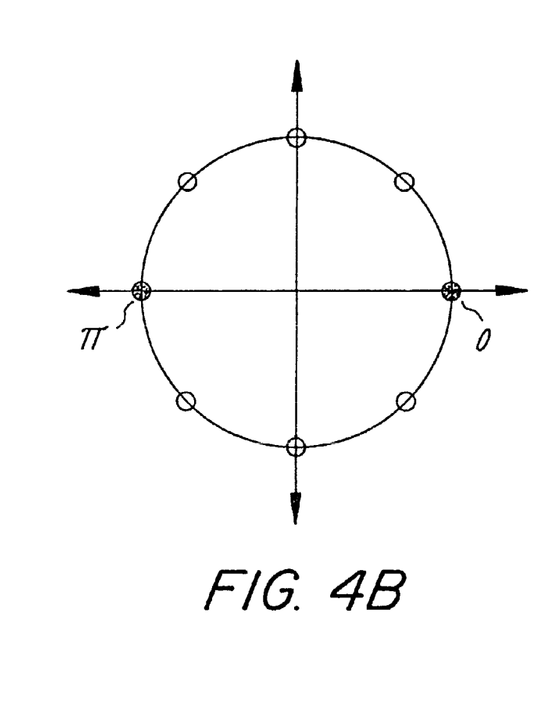

FIGS. 2A–2D provide a second example to better illustrate a preferred embodiment of the present invention. In the example illustrated in FIGS. 2A–2D, it is assumed that the channel introduces no distortion or noise (i.e., the signal transmitted is identical to the signal received). It is also assumed that the telecommunications system employs two modulation schemes, for example, 4-PSK and 8-PSK. Furthermore, it is assumed that both modulation schemes employ the same binary training sequence 0110. As the training sequence is a binary training sequence, each symbol (i.e., each bit) identifies one of two points in the symbol constellation for both the 4-PSK and 8-PSK scheme, as illustrated in FIGS. 4A and 4B. FIGS. 4A and 4B also illustrate that in a preferred embodiment, the same two points on the symbol constellation are used for both the 4-PSK and the 8-PSK scheme during training, for example, the point a 0 and π. It will be recognized, however, that the phase rotation technique of the present invention can be employed with longer and/or non-binary training sequences.

As previously explained, each modulation scheme is to be assigned a unique phase rotation factor. In the present example, the 4-PSK modulation scheme is assigned a phase rotation factor of −π/4. The 8-PSK modulation scheme is assigned a phase rotation factor of π/8.

Figure 2A:
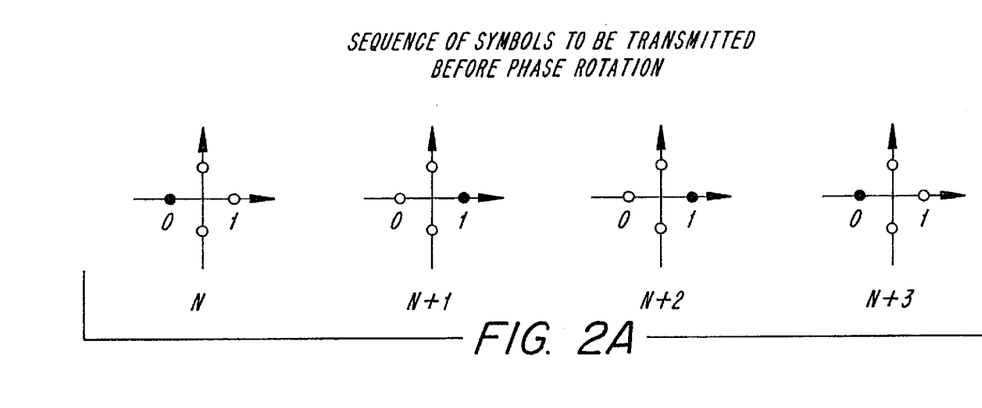
FIGS. 2A–2D further illustrate the phase rotation and phase de-rotation technique in accordance with the present invention.

FIG. 2A specifically shows the sequence of symbols N, N+1, N+2, and N+3 to be transmitted, wherein the first symbol N equals 0, the second symbol N+1 equals 1, the third symbol N+2 equals 1, and the fourth symbol N+3 equal 0. It should be noted that the four symbols N, N+1, N+2, and N+3 in FIG. 2A have not yet been rotated.

Figure 2B:
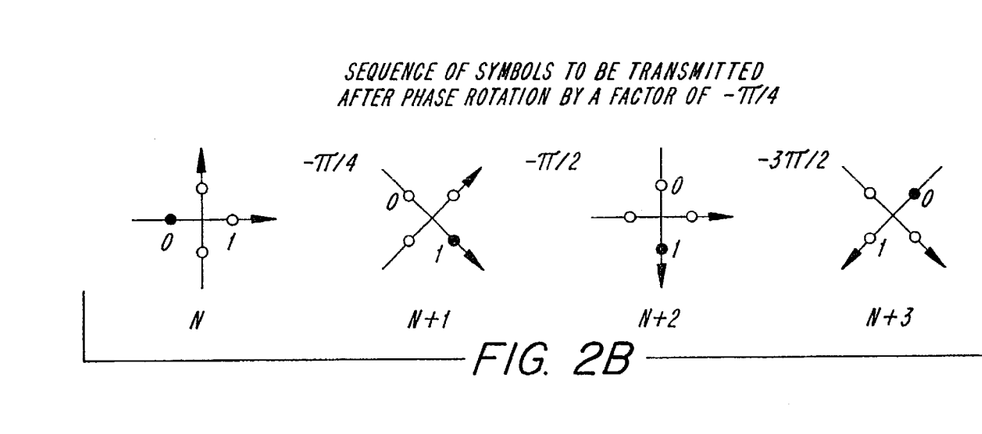

In FIG. 2B, the four symbols have been rotated at the transmitter using a phase rotation factor of −π/4, as the 4-PSK modulation scheme is currently being employed, though, as stated previously, only two of the four points on the 4-PSK symbol constellation are being used during training. Accordingly, the first symbol N remains unshifted, the second symbol N+1 has been rotated by −π/4, the third symbol N+2 has been rotated by an additional −π/4 for a total amount of rotation equal to −π/2 (i.e., 2π/4), and the fourth symbol N+3 has been rotated by yet another −π/4 for a total amount of rotation equal to −π/4.

Figure 2C:
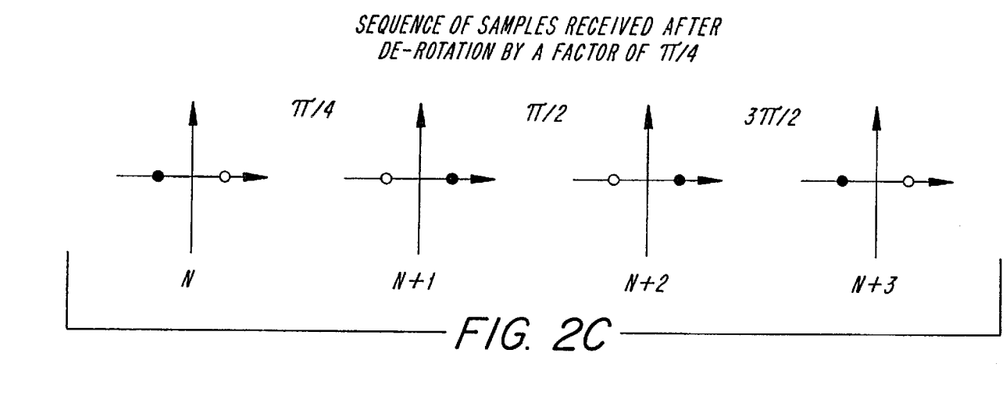
Figure 2D:
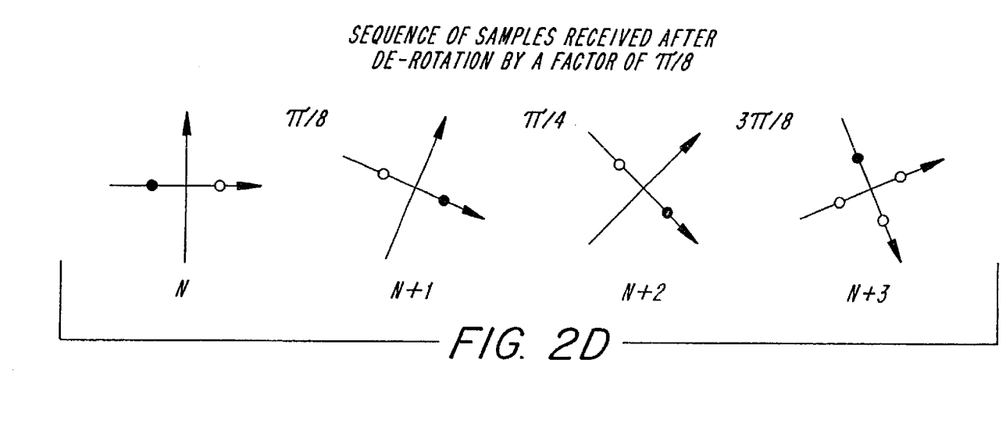

Whereas FIGS. 2A and 2B illustrate the symbol sequence to be transmitted before and after phase rotation respectively, FIGS. 2C and 2D illustrate the received symbols (i.e., samples) after the receiver has de-rotated them. In a preferred embodiment of the present invention, the receiver de-rotates each of the received samples using the phase rotation factor associated with each modulation scheme employed by the telecommunications system. In the present example, there are two modulation schemes, 4-PSK and 8-PSK, as previously mentioned. The first modulation scheme, 4-PSK, was assigned the phase rotation factor of −π/4, whereas the second modulation scheme, 8-PSK, was assigned the phase rotation factor of −π/8. Accordingly, FIG. 2C illustrates the sequence of samples N, N+1, N+2 and N+3 after the receiver has de-rotated each by a phase rotation factor of π/4. In contrast, FIG. 2D illustrates the sequence of samples N, N+1, N+2 and N+3 after the receiver has de-rotated each by a phase rotation factor of π/8. Comparing FIG. 2C with FIG. 2D, one skilled in the art will appreciate that only by de-rotating the received samples by the appropriate phase rotation factor, π/4 in the present case, is the receiver able to recover the expected sequence 0110. Therefore, the receiver is able to determine, based on the phase rotation factor required to recover the expected sequence 0110, that the current modulation scheme is 4-PSK rather than 8-PSK.

Figure 3A:
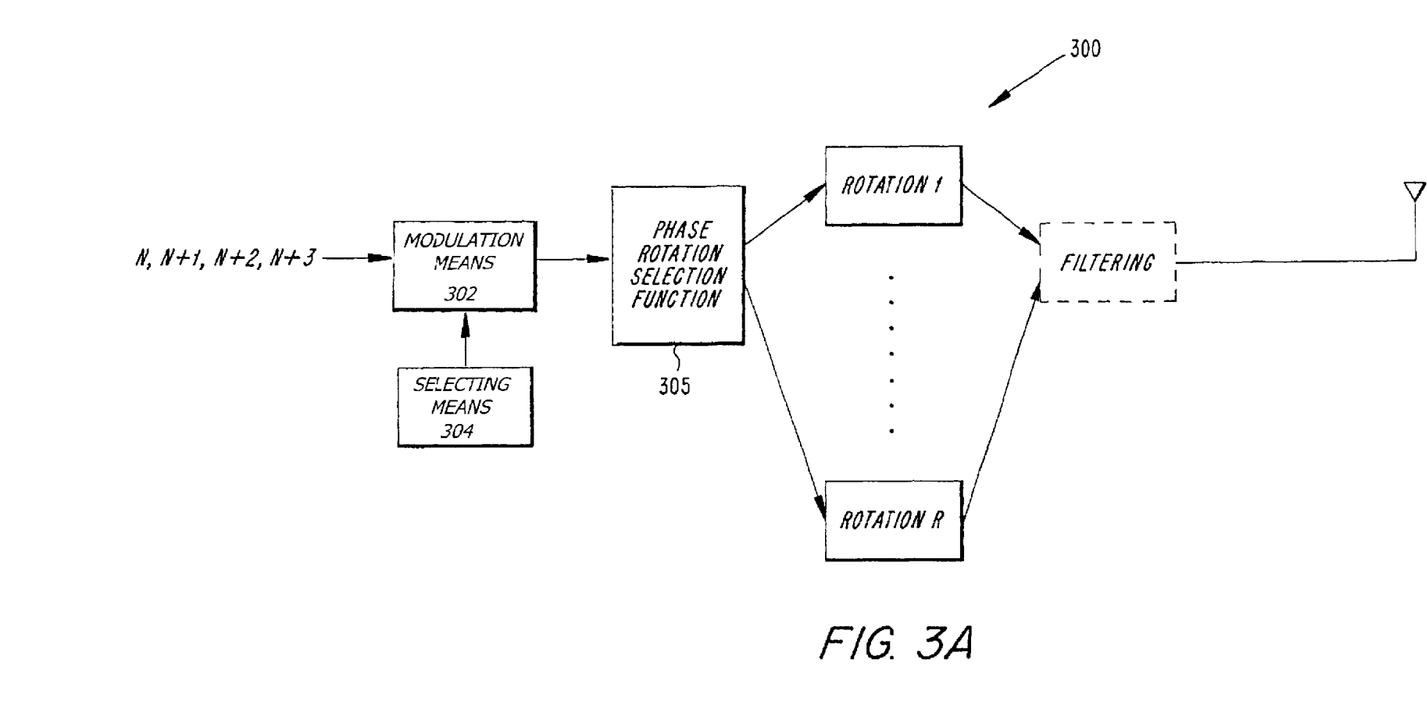
FIGS. 3A–3B illustrate exemplary configurations for a transmitter and a receiver respectively, in accordance with the present invention.
Figure 3B:
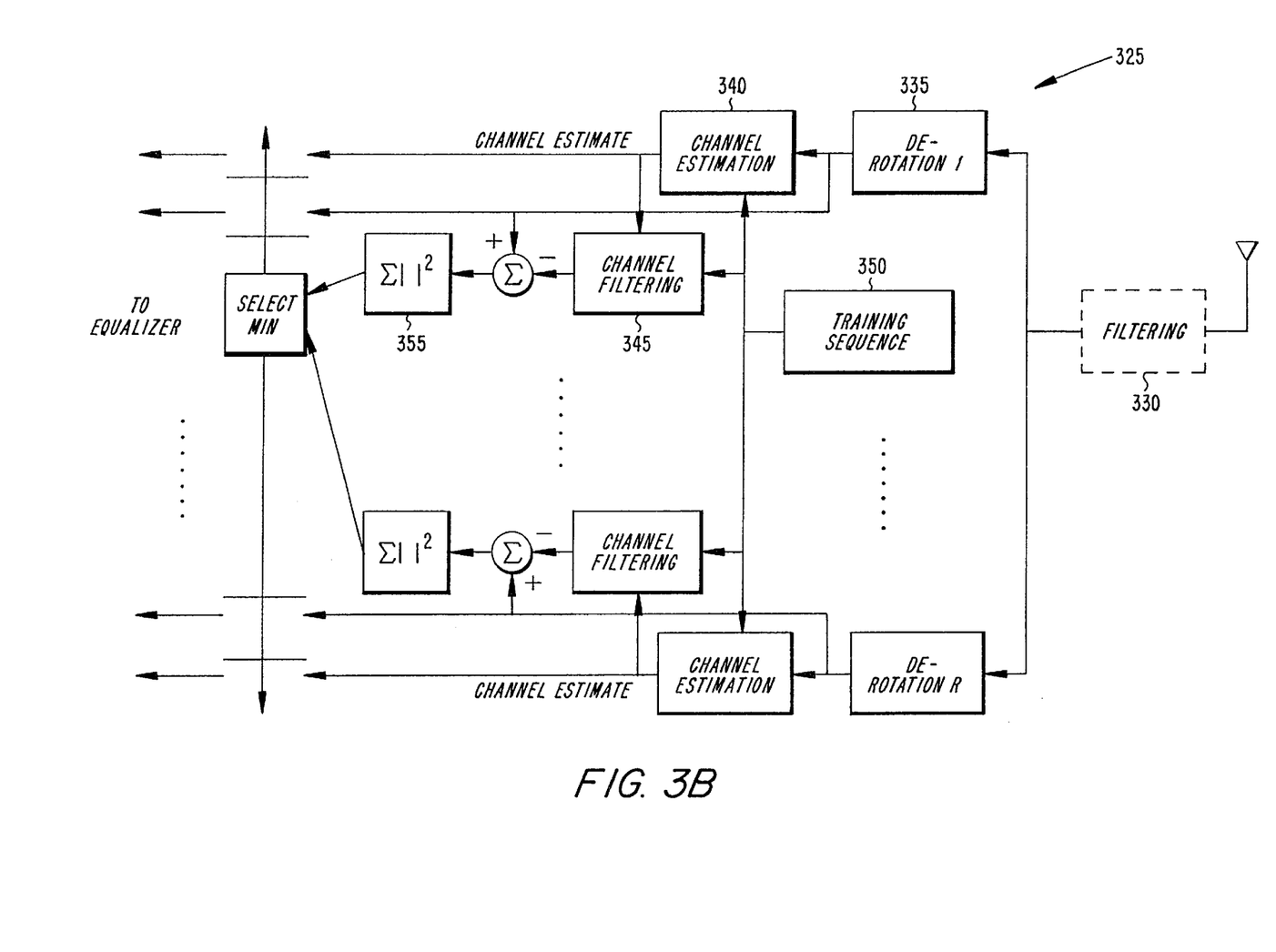

FIGS. 3A and 3B illustrate an exemplary, functional configuration for a transmitter and a receiver in accordance with the present invention. For instance, FIG. 3A represents a transmitter 300, wherein a sequence of training symbols N, N+1, N+2, and N+3 are modulated by modulation means 302. The particular modulation scheme employed is selected from one of a number of different modulation schemes M (e.g., 4-PSK) by means for selecting 304. A phase rotation selection function 305 then selects the appropriate phase rotation factor I thru R which corresponds to the selected modulation scheme. Each of the training symbols are then rotated accordingly, filtered by a pulse-shaping filter 310, and transmitted to an intended receiver. It will be understood that in a preferred embodiment of the present invention, the symbols representing data transmitted along with the training symbols are also rotated in accordance with the same phase rotation factor.

FIG. 3B illustrates the functional features which make up the intended receiver 325. Initially, the received signal (i.e., the analog signal containing the training symbols) is filtered by a receiver filter 330, and the samples corresponding to the training symbols are generated and forwarded to a number of phase de-rotation modules, for example, phase de-rotation module 335. Each of the phase de-rotation modules, as the name suggests, de-rotates the received training samples by one of the phase rotation factors 1-R. Accordingly, each de-rotation module generates a set of derotated training samples. A channel estimation function, for example, channel estimation function 340, then performs a channel estimation based on the corresponding set of de-rotated training samples. A channel filtering function, for example, channel filtering function 345, then adjusts an expected training sequence 350 as a function of the corresponding channel estimation. The expected, adjusted training sequence is then compared with the corresponding set of de-rotated training samples, so as to produce a corresponding error signal, for example, error signal 355. The error signals associated with each set of de-rotated training samples are then compared and the modulation scheme associated with the least amount of error is identified. After channel estimation, information/data samples associated with the present burst of data are derotated using the phase rotation factor associated with the identified modulation scheme.

If the telecommunications system does not use training sequences, phase rotation can still be employed to transmit signaling information. Without training sequences, the receiver might have an adaptive equalizer, whose parameters are changed continuously to minimize errors during equalization. Such errors can then be used by an adaptive algorithm to change the parameters (e.g., the filter coefficients in the equalizer) and to decrease the error. Typically, if the channel characteristics do not change rapidly, the errors will be large initially, though the errors will decrease later (assuming the correct modulation scheme was chosen).

In this alternative embodiment, the invention can be implemented as previously described with respect to the transmitter. However, at the receiver, instead of doing parallel channel estimations with different de-rotations, parallel adaptive equalization is accomplished assuming different de-rotations. After a sufficient period of time, the choice of rotation factor can be made based on error measured by the parallel adaptive equalization branches, wherein only the best equalization branch will continue.

In yet another embodiment, the receiver performs a coherent detection without the use of an equalizer. A RAKE receiver is an example of a receiver with this capability. RAKE receivers employ a ray tracking function to perform channel estimation, as is well known in the art.

As previously stated, GMSK is a non-linear modulation scheme, used, for example, in the GSM. According to differential precoding techniques, the binary information is transmitted with a $+\pi/2$ phase shift if the present bit is the same as the previous bit, and a $-\pi/2$ phase shift if the present bit is not the same as the previous bit. This way a transmitted symbol depends on the latest bit, and the bits previously sent. Thus, it can be said that there is memory in the modulation. Therefore, conventional demodulation of a GMSK modulated signal requires that the receiver de-rotate the received samples by a phase rotation factor of $\pi/2$.

If the present invention is used, for example, in conjunction with a telecommunications system that employs multiple modulation schemes, including GMSK, the phase rotation associated with the GMSK modulation scheme can be utilized by the receiver to distinguish a GMSK modulated signal from signals modulated in accordance with, for example, 8-PSK or 4-PSK. Of course, the 8-PSK and the 4-PSK modulation schemes would be assigned phase rotation factors other than $\pi/2$. In a preferred embodiment of the present invention, the 4-PSK modulation scheme is assigned a phase rotation factor of $\pi/4$. Whereas, the 8-PSK modulation scheme is assigned a phase rotation factor of $\pi/8$. One skilled in the art will appreciate, however, that it is also possible to distinguish one of the latter two modulation schemes by assigning it a unique phase rotation factor, including a zero-phase rotation factor.

Although the present invention can be used for transmitting modulation information, one skilled in the art will appreciate that the present invention can also be used to implement an inband signaling channel that efficiently transmits signaling information, other than modulation information. For instance, it may be of interest to transmit coding information, or it may be of interest to transmit power control commands to order, for example, an increase or a decrease in the power level associated with the opposite link direction (i.e., the uplink or downlink direction).

In summary, the present invention provides a transmission technique wherein a transmitter in a telecommunications system that employs multiple modulation schemes, particularly for the purpose of link adaptation, to transmit modulation scheme information, and the like, to a receiver without increasing transmission bandwidth or transmission delay, despite the fact that the various modulation schemes may employ the same symbol rates and training sequences.

The present invention has been described with reference to a preferred embodiment. However, it will be readily apparent to those skilled in the art that it is possible to embody the invention in specific forms other than the preferred embodiment described above, and that this may be done without departing from the spirit of the invention. The preferred embodiment described above is illustrative and should not be considered restrictive in any way. The scope of the invention is given by the appended claims, rather than the preceding description, and all variations and equivalents which fall within the range of the claims are intended to be embraced therein.

What is claimed is:

1. In a digital telecommunications system, a method for transmitting signaling information from a transmitter to a receiver comprising the steps of:

identifying one of a plurality of information signals to be conveyed from the transmitter to the receiver in addition to data;

rotating each of one or more symbols by a common phase rotation factor, wherein the phase rotation factor uniquely identifies the one information signal to be conveyed from the transmitter to the receiver; and transmitting each of the one or more phase-rotated symbols to the receiver.

2. The method of claim 1 further comprising the steps of:

in the receiver, receiving a signal containing the one or more phase-rotated symbols;

generating samples of the received signal, wherein the samples correspond to the phase-rotated symbols;

de-rotating the samples, so as to recover a value associated with each of the one or more symbols; and identifying the one information signal conveyed to the receiver from the transmitter as a function of the phase rotation factor required to recover the value associated with each of the one or more symbols.

3. The method of claim 1, wherein the information signal represents one of a plurality of signal power control commands.

4. The method of claim 1, wherein the information signal represents one of a plurality of modulation schemes.

5. The method of claim 1, wherein the information signal represents coding information.

6. The method of claim 1, wherein the one or more symbols are training symbols.

7. The method of claim 1, wherein the one or more symbols include both training and data symbols.

8. In a digital telecommunications system, a method for conveying modulation information from a transmitter to a receiver, said method comprising the steps of:

selecting one of a plurality of modulation schemes;

modulating a sequence of training symbols in accordance with the selected one of the plurality of modulation schemes;

identifying a phase rotation factor which corresponds to the selected one of the plurality of modulation schemes, wherein at least one unique phase rotation factor is associated with each of the plurality of modulation schemes;

rotating the phase of each training symbol as a function of the identified phase rotation factor which corresponds to the selected one of the plurality of modulation schemes;

transmitting the sequence of phase-rotated training symbols to the receiver;

at the receiver, generating a sequence of de-rotated training symbols for each phase rotation factor by de-rotating the received sequence of phase-rotated training symbols as a function of each phase rotation factor;

comparing each sequence of de-rotated training symbols to an expected sequence of training symbols;

identifying the sequence of de-rotated training symbols that approximates the expected sequence of training symbols most accurately; and identifying the selected one of the plurality of modulation schemes based on the phase rotation factor that produced the sequence of de-rotated training symbols that most closely approximated the expected sequence of training symbols.

9. The method of claim 8 further comprising the step of:

deriving a channel estimation for each sequence of de-rotated training symbols; and prior to comparing each sequence of de-rotated training symbols to the expected sequence of training symbols, adjusting the sequence of expected training symbols as a function of the derived channel estimation corresponding to the sequence of de-rotated training symbols to which the sequence of expected training symbols is to be compared.

10. The method of claim 8, wherein said step of selecting one of a plurality of modulation schemes is a function of a link quality adaptation assessment.

11. The method of claim 8, wherein the sequence of training symbols to be transmitted to the receiver from the transmitter is the same for two or more of the modulation schemes.

12. The method of claim 8, wherein the selected one of the plurality of modulation schemes involves Gaussian Minimum Shift Keying.

13. The method of claim 8, wherein the selected one of the plurality of modulation schemes involves 4-Phase Shift Keying.

14. The method of claim 8, wherein the selected one of the plurality of modulation schemes involves 8-Phase Shift Keying.

15. In a digital telecommunications system, a method for identifying signaling information transmitted from a transmitter to a receiver along with data, said method comprising the steps of:

receiving a signal containing a sequence of symbols transmitted from the transmitter, wherein the symbols include training symbols and data symbols, and wherein the phase associated with each symbol in the sequence of symbols has been rotated at the transmitter in accordance with a common phase rotation factor that corresponds to the signaling information;

generating samples from the received signal, wherein the samples correspond to the sequence of transmitted symbols;

recovering the sequence of transmitted symbols by de-rotating the samples in accordance with the common phase rotation factor; and identifying the signaling information as a function of the common phase rotation n factor used to recover the sequence of transmitter symbols.

16. The method of claim 15 further comprising the steps of:

de-rotating each of the samples in accordance with a plurality of different phase rotation factors, wherein each of the plurality of different phase rotation factors corresponds to different signaling information, and wherein the de-rotation of the samples, in accordance with each of the different phase rotation factors, results in a sequence of de-rotated samples for each of the different phase rotation factors;

comparing each sequence of de-rotated samples to an expected sequence of symbols; and identifying the phase rotation factor associated with the sequence of de-rotated samples that best matches the expected sequence of symbols.

17. In a digital telecommunications system, an apparatus for transmitting signaling information from a transmitter to a receiver comprising:

means for identifying one of a plurality of information signals to be conveyed from the transmitter to the receiver in addition to data;

means for rotating each of one or more symbols by a common phase rotation factor, wherein the phase rotation factor uniquely identifies the one information signal to be conveyed from the transmitter to the receiver; and means for transmitting each of the one or more phase-rotated symbols to the receiver.

18. The apparatus of claim 17 further comprising:

in the receiver, means for receiving a signal containing the one or more phase-rotated symbols;

means for generating samples of the received signal, wherein the samples correspond to the phase-rotated symbols;

means for de-rotating the samples, so as to recover a value associated with each of the one or more symbols; and means for identifying the one information signal conveyed to the receiver from the transmitter as a function of the phase rotation factor required to recover the value associated with each of the one or more symbols.

19. The apparatus of claim 17, wherein the information signal represents one of a plurality of signal power control commands.

20. The apparatus of claim 17, wherein the information signal represents one of a plurality of modulation schemes.

21. The apparatus of claim 17, wherein the information signal represents coding information.

22. The apparatus of claim 17, wherein the one or more symbols are training symbols.

23. The apparatus of claim 17, wherein the one or more symbols include both training and data symbols.

24. In a digital telecommunications system, an apparatus for conveying modulation information from a transmitter to a receiver, said apparatus comprising:

means for selecting one of a plurality of modulation schemes;

means for modulating a sequence of training symbols in accordance with the selected one of the plurality of modulation schemes;

means for identifying a phase rotation factor which corresponds to the selected one of the plurality of modulation schemes, wherein at least one unique phase rotation factor is associated with each of the plurality of modulation schemes;

means for rotating the phase of each training symbol as a function of the identified phase rotation factor which corresponds to the selected one of the plurality of modulation schemes;

means for transmitting the sequence of phase-rotated training symbols to the receiver;

at the receiver, means for generating a sequence of de-rotated training symbols for each phase rotation factor by de-rotating the received sequence of phase-rotated training symbols as a function of each phase rotation factor;

means for comparing each sequence of de-rotated training symbols to an expected sequence of training symbols;

means for identifying the sequence of de-rotated training symbols that approximates the expected sequence of training symbols most accurately; and means for identifying the selected one of the plurality of modulation schemes based on the phase rotation factor that produced the sequence of de-rotated training symbols that most closely approximated the expected sequence of training symbols.

25. The apparatus of claim 24 further comprising:

means for deriving a channel estimation for each sequence of de-rotated training symbols; and prior to comparing each sequence of de-rotated training symbols to the expected sequence of training symbols, means for adjusting the sequence of expected training symbols as a function of the derived channel estimation corresponding to the sequence of de-rotated training symbols to which the sequence of expected training symbols is to be compared.

26. The apparatus of claim 24, wherein said means for selecting one of a plurality of modulation schemes is a function of a link quality adaptation assessment.

27. The apparatus of claim 24, wherein the sequence of training symbols to be transmitted to the receiver from the transmitter is the same for two or more of the modulation schemes.

28. The apparatus of claim 24, wherein the selected one of the plurality of modulation schemes involves Gaussian Minimum Shift Keying.

29. The apparatus of claim 24, wherein the selected one of the plurality of modulation schemes involves 4-Phase Shift Keying.

30. The apparatus of claim 24, wherein the selected one of the plurality of modulation schemes involves 8-Phase Shift Keying.

31. In a digital telecommunications system, a apparatus for identifying signaling information transmitted from a transmitter to a receiver along with data, said apparatus comprising:

means for receiving a signal containing a sequence of symbols transmitted from the transmitter, wherein the symbols include training symbols and data symbols, and wherein the phase associated with each symbol in the sequence of symbols has been rotated at the transmitter in accordance with a common phase rotation factor that corresponds to the signaling information;

means for generating samples from the received signal, wherein the samples correspond to the sequence of transmitted symbols;

means for recovering the sequence of transmitted symbols by de-rotating the samples in accordance with the common phase rotation factor; and means for identifying the signaling information as a function of the common phase rotation factor used to recover the sequence of transmitted symbols.

32. The apparatus of claim 31 further comprising:

means for de-rotating each of the samples in accordance with a plurality of different phase rotation factors, wherein each of the plurality of different phase rotation factors corresponds to different signaling information, and wherein the de-rotation of the samples, in accordance with each of the different phase rotation factors, results in a sequence of de-rotated samples for each of the different phase rotation factors;

means for comparing each sequence of de-rotated samples to an expected sequence of symbols; and means for identifying the phase rotation factor associated with the sequence of de-rotated samples that best matches the expected sequence of symbols.

\* \* \* \* \*